(12) United States Patent
Bevington

(10) Patent No.: US 11,531,771 B2
(45) Date of Patent: Dec. 20, 2022

(54) METHODS OF DECRYPTING DISK IMAGES, AND DECRYPTION-ENABLING DEVICES

(71) Applicant: BAE SYSTEMS plc, London (GB)

(72) Inventor: Ross James Bevington, Gloucester (GB)

(73) Assignee: BAE SYSTEMS PLC, London (GB)

( * ) Notice: Subject to any disclaimer, the term of this patent is extended or adjusted under 35 U.S.C. 154(b) by 315 days.

(21) Appl. No.: 16/768,195

(22) PCT Filed: Nov. 20, 2018

(86) PCT No.: PCT/GB2018/053348
§ 371 (c)(1),
(2) Date: May 29, 2020

(87) PCT Pub. No.: WO2019/106337
PCT Pub. Date: Jun. 6, 2019

(65) Prior Publication Data
US 2020/0372159 A1    Nov. 26, 2020

(30) Foreign Application Priority Data
Nov. 30, 2017   (GB) ...................................... 1719910

(51) Int. Cl.
*G06F 21/60*    (2013.01)
*G06F 13/42*    (2006.01)
*G06F 21/78*    (2013.01)
*H04L 9/08*     (2006.01)
*G06F 21/62*    (2013.01)

(52) U.S. Cl.
CPC ........ *G06F 21/602* (2013.01); *G06F 13/4221* (2013.01); *G06F 21/6218* (2013.01);
(Continued)

(58) Field of Classification Search
CPC ........ G06F 21/60; G06F 21/602; G06F 21/62; G06F 21/6218; G06F 21/78; G06F 21/79;
(Continued)

(56) References Cited

U.S. PATENT DOCUMENTS

| 8,990,583 | B1* | 3/2015 | McEachron | ........ G06F 12/1408 |
| | | | | 713/193 |
| 2003/0074319 | A1* | 4/2003 | Jaquette | ................ G06F 21/805 |
| | | | | 380/22 |

(Continued)

FOREIGN PATENT DOCUMENTS

WO    2019106337 A1    6/2019

OTHER PUBLICATIONS

International Preliminary Report on Patentability received for PCT Application No. PCT/GB2018/053348, dated Jun. 11, 2020 8 pages.
(Continued)

*Primary Examiner* — Shaqueal D Wade-Wright
*Assistant Examiner* — Shaqueal D Wade
(74) *Attorney, Agent, or Firm* — Finch & Maloney PLLC

(57) ABSTRACT

A decryption-enabling device for decrypting a disk image of a computer device, comprising a processor, memory and a hardware connector for connecting to the hardware interface connection of the computer device. The decryption-enabling device is arranged to create using the processor a copy of the random-access memory of the computer device, analyse using the processor the copy of the random-access memory to extract one or more potential decryption keys, and store the one or more potential decryption keys in the memory.

21 Claims, 3 Drawing Sheets

(52) U.S. Cl.
CPC ............ *G06F 21/78* (2013.01); *H04L 9/0819* (2013.01); *H04L 9/0894* (2013.01); *G06F 2213/0024* (2013.01)

(58) Field of Classification Search
CPC .......... G06F 21/82; G06F 21/85; G06F 13/42; G06F 13/4221; H04L 9/08; H04L 9/0819; H04L 9/0894
See application file for complete search history.

(56) References Cited

U.S. PATENT DOCUMENTS

| | | | |
|---|---|---|---|
| 2010/0241977 A1 | 9/2010 | Greetham | |
| 2012/0237024 A1* | 9/2012 | Liu | H04L 9/0897 380/44 |
| 2013/0019111 A1* | 1/2013 | Martin | G06F 21/62 713/193 |
| 2016/0021068 A1* | 1/2016 | Jueneman | H04L 9/3226 713/168 |
| 2016/0026810 A1* | 1/2016 | Hagiwara | H04L 9/3239 713/193 |
| 2021/0365487 A1* | 11/2021 | Chen | G06F 40/237 |

OTHER PUBLICATIONS

International Search Report and Written Opinion received for PCT Application No. PCT/GB2018/053348, dated Jan. 30, 2019. 9 pages.

GB Search Report under Section 17(5) received for GB Application No. 1719910.0 dated May 17, 2018. 4 pages.

Muller, T. and Freiling, F.C., "A Systematic Assessment of the Security of Full Disk Encryption", IEEE Transactions on Dependable and Secure Computing, vol. 12., No. 5, Sep./Oct. 2015. pp. 491-503.

"Tactical IT Intrusion Portfolio", Finfirewire, Dec. 8, 2011. URL: https://wikileaks.org/spyfiles/files/0/293_GAMMA-201110-FinFireWire.pdf. 2 pages.

Saravanan and Krishnan, "Forensic Recovery of Fully Encrypted Volume", International Journal of Computer Applications, (0975-8887), vol. 91, No. 7, Apr. 2014. pp. 18-21.

Anonymous, "GitHub—ufrisk/pcileech: Direct Memory Access (DMA) Attack Software", Sep. 17, 2017. URL: https://web.archive.org/web/20170917173344/https://github.com/ufrisk/pcileech. 5 pages.

Casey, et al., "The growing impact of full disk encryption on digital forensics", Digital Investigation, Elsevier, vol. 8, No. 2, Sep. 24, 2011. pp. 129-134.

* cited by examiner

METHODS OF DECRYPTING DISK IMAGES, AND DECRYPTION-ENABLING DEVICES

FIELD OF THE INVENTION

The present invention concerns methods of decrypting disk images, and decryption-enabling devices. More particularly, but not exclusively, this invention concerns the decryption of a disk image of a computer device by extracting encryption keys from the random access memory of the computer device.

BACKGROUND OF THE INVENTION

Full disk encryption is becoming a commonly used technology. Using full disk encryption, the whole contents of a hard disk (or of a disk image on a hard disk) of a computer device, such as a personal computer (PC) or laptop, is encrypted. Decryption of the contents so that the computer device can be used is then enabled by the encryption key being provided when the computer device is powered on. The encryption key may be a manually-entered password, a key stored on a smart card or on a Trusted Platform Module (TPM) device, or any other suitable method. Full disk encryption technologies include Microsoft BitLocker, True-Crypt and FileVault, for example.

However, the use of full disk encryption technology provides an obstacle to forensic analysis of a computer device, for example to obtain evidence of criminal activities.

Where full disk encryption is used on a computer device, when the computer device is in use the encryption keys will be present in the random-access memory (RAM) of the computer device, i.e. it's dynamic working memory. Software is known that claims to be able to decrypt full disk encryption. However, this software requires access to an unlocked computer device, i.e. one in which the user has given up their password. Further, the software must be installed onto the computer device itself, which forensically contaminates the computer device, i.e. changes to the computer device and so adversely affects its evidential value.

It would be desirable to be able to access the contents of a disk image that is encrypted using full disk encryption, without the above-mentioned disadvantages.

The present invention seeks to solve and/or mitigate the above-mentioned problems. Alternatively and/or additionally, the present invention seeks to provide improved methods of decrypting disk images, and improved decryption-enabling devices.

SUMMARY OF THE INVENTION

In accordance with a first aspect of the invention there is provided a method of decrypting a disk image of a computer device, comprising the steps of:
connecting a decryption-enabling device to a hardware interface connection of the computer device;
the decryption-enabling device creating a copy of the random-access memory of the computer device;
analysing the copy of the random-access memory to extract one or more potential decryption keys; and
decrypting the disk image of the computer device using at least one of the one or more potential decryption keys.

By connecting the decryption-enabling device to the computer device via a hardware interface connection, the decryption-enabling device is considered by the computer device to be a hardware peripheral, and so is trusted by the computer device. Consequently, it is given free access to the hardware of the computer device, and is able to extract a copy (a memory dump) of the RAM of the computer device. In particular, it is able to do so without requiring the computer device to be unlocked, so a password from the user of the device is not required. The copy of the RAM is then analysed to extract any potential decryption keys, using any suitable method of which many are known. The disk image is then decrypted using one or more of the potential decryption keys, i.e. the key or keys that are the correct keys to decrypt the disk image. In this way, the disk image can be decrypted without the user password being required, and without any software needing to be installed on the disk image so maintaining its forensic integrity.

The disk image may be on an internal or external hard disk of the computer device, a USB drive, or any other suitable storage device. The disk image may comprise the entirety or only a part of the storage of the storage device.

The computer device may run the Windows operating system (OS), Mac OS, Linux or any other suitable OS.

Preferably, the hardware interface connection is for connecting hardware peripherals to the computer device. The hardware peripherals may be network cards, hard disks or any other appropriate hardware peripherals. The hardware interface connection may be a Peripheral Component Interconnect (PCI) standard connection. The hardware interface connection may be a Peripheral Component Interconnect eXtended (PCI-X) standard connection, Peripheral Component Interconnect Express (PCI-e) standard connection, or any other PCI standard connection. Alternatively, the hardware interface connection may be an IEEE 1394 standard connection (also known as FireWire, i.LINK or Lync). Alternatively, the hardware interface connection may be a Thunderbolt connection. It will be appreciated that any other hardware interface connection could be used.

The copy of the random-access memory of the computer device may be created in memory of the decryption-enabling device. In this case, the copy of the random-access memory of the computer device may be created on a removable memory card of the decryption-enabling device. The removable memory card may be an SD card or the like, though it will be appreciated that any removable memory card could be used, as could a USB drive, hard drive (removable or otherwise), RAM or any other suitable storage.

Preferably, the step of analysing the copy of the random-access memory to extract one or more potential decryption keys is performed by the decryption-enabling device. Alternatively, the extraction one or more potential decryption keys may be performed by another device.

The method may further comprising the step of sending the one or more potential decryption keys to another device for decryption of the disk image. The one or more potential decryption keys may be sent via a local area network (LAN) for over a wired or wireless network connection, for example. Alternatively, the one or more potential decryption keys may be saved on a USB drive, memory card (e.g. the memory card on which copy of random-access memory is created, or another memory card), or other suitable storage, which is removed from the computer device and attached to the other device.

Preferably, the method further comprises the step of creating a copy of the disk image by copying it from a disk of the computer device, and wherein the copy of the disk image is decrypted using at least one of the one or more potential decryption keys. This allows a complete copy of the disk image in its original form to be preserved. Advantageously, the copy of the disk image is created by the decryption-enabling device. The copy of the disk image may be created on a hard disk of the decryption-enabling device.

The method may further comprise the step, prior to decrypting the disk image, of removing the disk on which the disk image is found from the computer device. This prevents the computer device from making any further changes to the disk image, for example simply due to ongoing running of the computer device. The computer device may be powered down before the disk is removed. The disk may then be connected to the decryption-enabling device, or another device which will copy and/or decrypt the disk image.

In accordance with a second aspect of the invention there is provided a decryption-enabling device for decrypting a disk image of a computer device, comprising:

a processor;

memory; and a hardware connector for connecting to the hardware interface connection of the computer device;

wherein the decryption-enabling device is arranged to:

create using the processor a copy of the random-access memory of the computer device;

analyse using the processor the copy of the random-access memory to extract one or more potential decryption keys; and store the one or more potential decryption keys in the memory.

The hardware connector may be for connection to a Peripheral Component Interconnect (PCI) standard connection. Alternatively, the hardware connector may be for connection to an IEEE 1394 standard connection. Alternatively, the hardware connector may be for connection to a Thunderbolt connection.

Preferably, the hardware connector comprises a socket for connecting a cable to connect the decryption-enabling device to the hardware interface connection of the computer device.

The decryption-enabling device may be further arranged to create using the processor the copy of the random-access memory of the computer device in the memory of the decryption-enabling device.

The decryption-enabling device may further comprise a card socket for receiving a memory card, and be further arranged to create using the processor the copy of the random-access memory of the computer device copy on a memory card received by the card socket.

The decryption-enabling device may be further arranged to send the one or more potential decryption keys to another device for decryption of the disk image.

The decryption-enabling device may be further arranged to create using the processor a copy of the disk image by copying it from a disk of the computer device, for decryption using at least one of the one or more potential decryption keys. In this case, the decryption-enabling device may further comprise a hard disk, and further arranged to create using the processor the copy of the disk image on the hard disk. The decryption-enabling device may then be further arranged to decrypt using the processor the disk image of the computer device using at least one of the one or more potential decryption keys.

In accordance with a third aspect of the invention there is provided a computer program comprising a set of instructions, which, when executed, cause a computer device to perform a method as described above.

In accordance with a fourth aspect of the invention there is provided a computer program comprising a set of instructions, which, when executed on a computer device, provide a decryption-enabling device as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
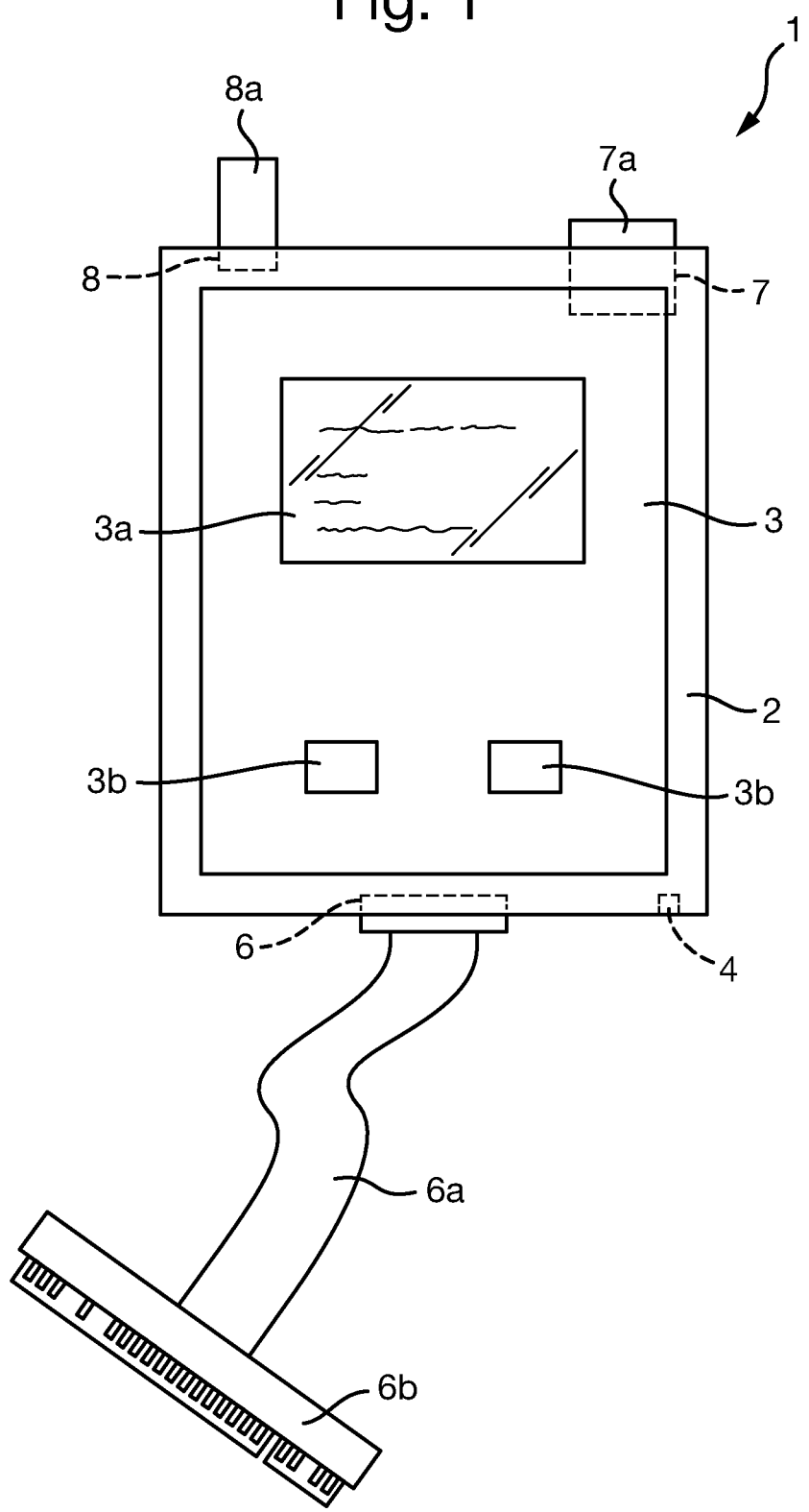
FIG. 1 shows a front view of a decryption-enabling device in accordance with an embodiment of the invention.
Figure 2:
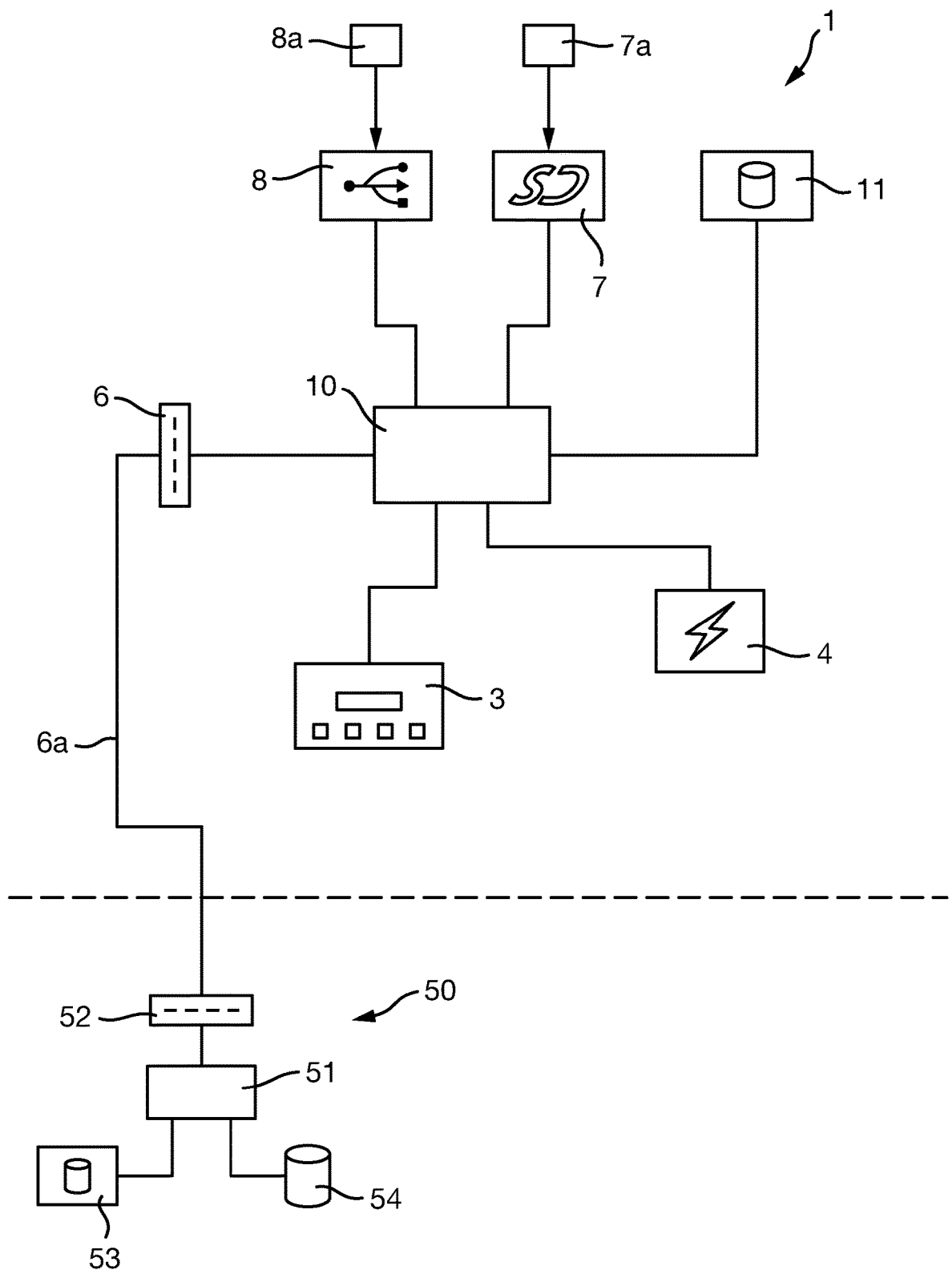
FIG. 2 is a schematic diagram of the functional parts of the decryption-enabling device of FIG. 1 and a computer device comprising an encrypted disk image to be decrypted.

A decryption-enabling device in accordance with an embodiment of the invention is now described, with reference to FIGS. 1 and 2.

FIG. 1 is a front view of the decryption-enabling device 1. The decryption-enabling device 1 comprises a housing 2 with a touchscreen 3, to provide a tablet-like device. The touchscreen 3 may display text 3a and buttons 3b, allowing a user to view information and interact with the decryption-enabling device 1.

The decryption-enabling device 1 comprises a power socket 4, via which a supply of power can be provided for the decryption-enabling device 1.

The decryption-enabling device 1 comprises a socket 6 into which is plugged a cable 6a, which has at its other end a connector 6b for connecting into a PCI standard slot. Also provided, but not shown, are alternative cables that can be plugging into the socket 6, and which have at their other end an IEEE 1394 standard plug and a Thunderbolt standard plug respectively.

The decryption-enabling device 1 also comprises an SD card receiver socket 7, into which is received an SD card 7a, and a USB socket 8, into which is received a USB drive 8a.

FIG. 2 is a schematic diagram of the functional parts of the decryption-enabling device 1. The decryption-enabling device 1 comprises a processor 10, which is in communication with memory 11. The processor 10 is also in communication with the touchscreen 3, power socket 4, socket 6, SD card receiver socket 7 (into which is received the SD card 7a), and USB socket 8 (into which is received a USB drive 8a), all as described above.

FIG. 2 also shows schematically a computer device 50, on which is a disk image the decryption-enabling device 1 is used to decrypt 1. The computer device 50 is a PC, but could be a laptop or any other suitable computer device. The computer device 50 comprises a processor 51, which is in communication with a PCI slot 52 (provided on the motherboard of the processor 51), and into which is connected the cable 6a which is connected to the socket 6 of the decryption-enabling device 1.

The computer device 50 also comprises RAM 53 (the working memory of the computer device 50) and a hard disk 54, both of which are in communication with the processor

51. The hard disk 54 has on it the disk image encrypted using full disk encryption which a user wishes to decrypt.

Figure 3A:
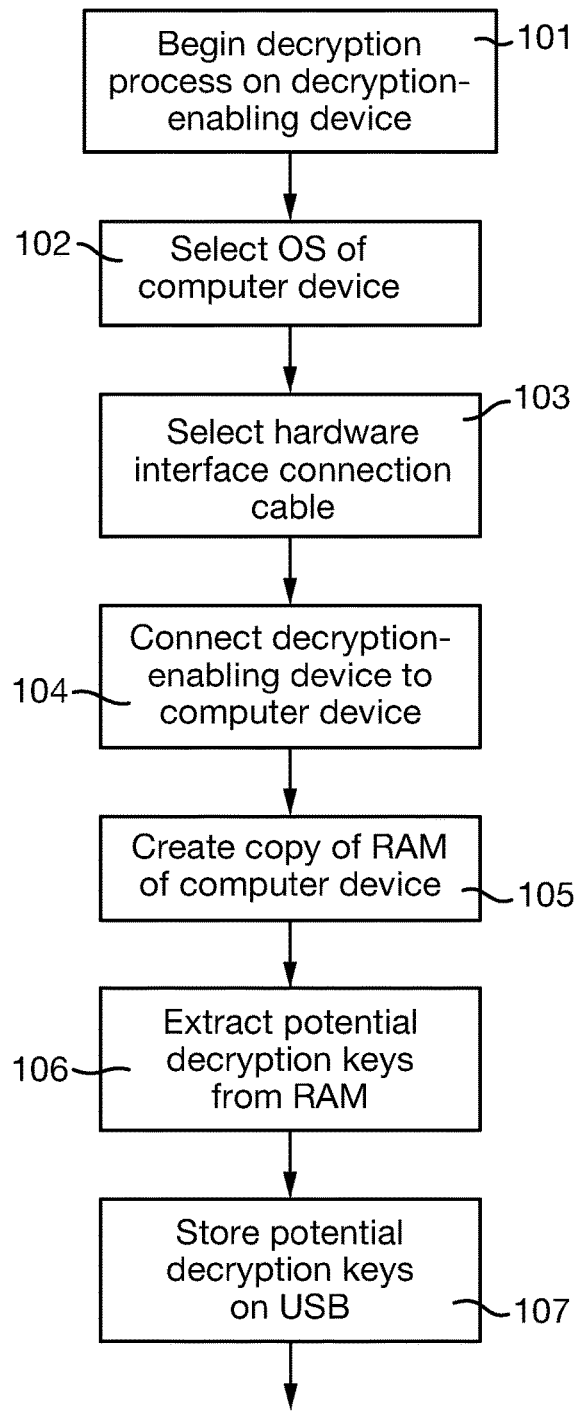
FIGS. 3a and 3b are flowcharts shows the operation of the decryption-enabling device to decrypt the disk image of the computer device.
Figure 3B:
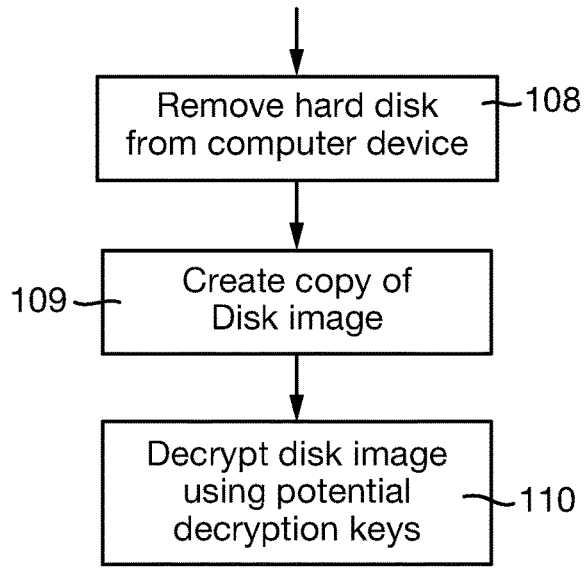

The operation of the decryption-enabling device 1 by the user to decrypt the disk image on the hard disk 54 of the computer device 50 is now described with reference to the flowcharts of FIGS. 3a and 3b. The user will have in their possession the computer device 50, which will be powered on (though could be in suspended mode) and have been in use so that the decryption keys required to decrypt the disk image are in the RAM 53 of the computer device 50. However, the computer device may be locked, and the user will not have knowledge of the password required to unlock the computer device 50.

First, the user begins the decryption process on the decryption-enabling device 1 (step 101). This may be done by the user selecting a particular option, or may be simply by powering on the decryption-enabling device 1. The user then selects the OS of the computer device 50 from a set of options provided by the decryption-enabling device 1 (step 102), e.g. Windows, Mac OS, Linux or the like.

The user then selects an appropriate cable for the hardware interface connectors available to use on the computer device 50 (step 103). The user does this using guidance provided by decryption-enabling device 1, which aids the user in identifying which hardware interface connectors available. In the present example, the user selects the cable 6a ending in the PCI standard connector 6b, while in other examples, a cable ending in an IEEE 1394 standard plug or Thunderbolt standard plug may be selected. The decryption-enabling device 1 preferably guides the user to select a cable for a hardware interface connector that is externally available and that provides the fastest connection, in favour of a hardware interface connector that provides a slower connection and/or is only accessible by opening the case of the computer device 50. (This is usually the case for PCI standard connectors, which are generally provided on the motherboard of a device.)

The user then connects one end to the socket 6 of the decryption-enabling device 1, and the other end to a suitable hardware interface connection of the computer device 50 (step 104). In the present example, the user does this by opening the case of the computer device 50 to give access to the motherboard of the computer device 50, and plugging the PCI connector 6b into an empty PCI slot on the motherboard of the computer device 50. Again, the decryption-enabling device 1 provides guidance to aid the user in doing this.

As part of this process, the user will select on the decryption-enabling device 1 the type of hardware interface connection being used, but in other embodiments the decryption-enabling device 1 may be able to identify the type of cable being used, for example from the socket 6a or the properties of the signals obtained from the hardware interface connection.

Once the decryption-enabling device 1 is connected to the computer device 50, it creates a copy of RAM 53 of the computer device 50, and stores it on the SD card 7a (step 105). It does this by making direct memory access (DMA) requests for the contents of the RAM 53, as can be done over the hardware interface connection.

The decryption-enabling device 1 then analyses the copy of the RAM on the SD card 7a, to identify any potential decryption keys it contains (step 106). This can be done using any suitable method, of which the skilled person will be aware of various. The decryption-enabling device 1 then stores the potential decryption keys on the USB drive 8a (step 107).

Next, the user powers down the computer device 50, and removes the hard disk 54 containing the disk image to be decrypted (step 108). A copy of the disk image is then made (step 109), using another device. The copy of the disk image is then decrypted using the appropriate key or keys of the potential decryption keys stored on the USB stick 8a (step 110). Again, this can be done on the same device as made the copy of the hard image, or on another device, with the potential decryption keys being provided to the device doing the decrypting simply by removing the USB stick 8a from the decryption-enabling device 1 and connecting it to the device. It will be appreciated that the potential decryption keys will include decryption keys that cannot be used to decrypt the disk image, and indeed sequences that are not in fact decryption keys at all, but that the correct decryption key or keys can be identified simply by trying them.

Once the disk image has been decrypted, it can be forensically analysed in any desired manner.

In this way, the disk image can be decrypted while maintaining the forensic integrity of the original disk image, as no software is installed on the hard disk 54 and indeed the encrypted contents of the hard disk 54 (or the disk image only) in its original form is copied, and deception performed on the copy, allowing the original hard disk 54 to be kept in its original form if required at a later date. Further, as the potential decryption keys are obtained directly from the RAM 53 of the computer device 50 via the hardware interface connection, the computer device 50 does not need to be unlocked for them to be obtained (or in order to install any software on the hard disk 54), and so the disk image can be decrypted without the password to unlock the computer device 50 being required.

In a particularly advantageous embodiment of the invention, the decryption-enabling device 1 also comprises a hard disk. In this embodiment, rather than powering off the computer device 50 and removing the hard disk 53 to copy the disk image, instead the decryption-enabling device 1 copies the encrypted contents of the disk image to the hard disk of the decryption-enabling device 1. This allows the disk image to be copied without the computer device being powered down. The decryption-enabling device 1 may then also decrypt the copy of the disk image, using the one or more potential decryption keys. It will be appreciated that in this embodiment, the decryption-enabling device 1 need not comprise a USB stick 8a on which the one or more potential decryption keys are stored, but can instead store them in its memory 11 or on the SD card 7a, for example.

While the present invention has been described and illustrated with reference to particular embodiments, it will be appreciated that the invention lends itself to many different variations not specifically illustrated herein. By way of example only, certain possible variations will now be described.

While above is described the decryption of a disk image of a hard disk 54, it is equally applicable to a disk image on a USB stick or the like. Further, while the decryption-enabling device 1 described above stores a copy of the RAM 53 of the computer device 50 on an SD card 7a, it could instead be stored instead in the memory 11 or in other suitable storage. The copy could be transmitted to another device for storage and analysis, for example via a wired or wireless network link. Similarly, the potential decryption keys and/or the copy of the encrypted disk image or the decrypted disk image if obtained by the decryption-enabling device 1 could be transmitted to another device by a wired or wireless network link. It will be appreciated that the features of the decryption-enabling device 1 and the steps of the method used to decrypt the disk image could be modified or omitted in various different ways, while still remaining in accordance with the underlying intention.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of decrypting a disk image of a computer device, the method comprising:
   receiving, by a decryption-enabling device connected to a hardware interface connection of the computer device, a copy of random-access memory of the computer device, wherein the copy of random-access memory is received from the computer device when the computer device is in a locked state;
   analyzing the copy of the random-access memory to extract one or more potential decryption keys; and
   decrypting the disk image of the computer device using at least one of the one or more potential decryption keys.

2. The method of claim 1, wherein the hardware interface connection is for connecting hardware peripherals to the computer device.

3. The method of claim 1, wherein the hardware interface connection is one of a Peripheral Component Interconnect (PCI) standard connection, an IEEE 1394 standard connection, or a Thunderbolt connection.

4. The method of claim 1, wherein the copy of the random-access memory of the computer device is stored in a memory of the decryption-enabling device or in a removable memory card of the decryption-enabling device.

5. The method of claim 1, wherein analyzing the copy of the random-access memory to extract one or more potential decryption keys is performed by the decryption-enabling device.

6. The method of claim 5, further comprising sending the one or more potential decryption keys to another device for decryption of the disk image.

7. The method of claim 1, further comprising creating the disk image by copying the disk image from a disk of the computer device.

8. The method of 7, wherein of the disk image is copied by the decryption-enabling device on a hard disk of the decryption-enabling device.

9. The method of claim 1, wherein prior to decrypting the disk image, a disk on which the disk image is found is removed from the computer device.

10. The method of claim 1, further comprising:
    transmitting, by the decryption-enabling device, a memory access request to the computer device, while the computer device is in the locked state, wherein the copy of random-access memory is received in response to the memory access request.

11. The method of claim 10, wherein the memory access request is a direct memory access request (DMA).

12. The method of claim 10, further comprising:
    when transmitting the memory access request, presenting, by the decryption-enabling device and to the computer device, the decryption-enabling device as a hardware peripheral.

13. The method of claim 1, wherein when the computer device is in the locked state, a password is required to be input to unlock the computer device, and wherein the copy of random-access memory is received without inputting the password and without unlocking the computer device.

14. The method of claim 1, further comprising:
    presenting, by the decryption-enabling device to the computer device, the decryption-enabling device as a hardware peripheral, such that the decryption-enabling device is trusted by the computer device and the copy of random-access memory is provided to the decryption-enabling device, without needing to transition the computer device from a locked state to an unlocked state.

15. A decryption-enabling device for decrypting a disk image of a computer device, the decryption-enabling device comprising:
    a processor;
    a memory; and
    a hardware connector for connecting to a hardware interface connection of the computer device;
    wherein the decryption-enabling device is arranged to
       transmit, to the computer device and while the computer device is in a locked state, a memory access request, wherein the memory access request is transmitted without unlocking the computer device,
       receive, in response to the memory access request, a copy of random-access memory of the computer device,
       analyze using the processor the copy of the random-access memory to extract one or more potential decryption keys, and
       store the one or more potential decryption keys in the memory.

16. The decryption-enabling device of claim 15, wherein the hardware connector comprises a socket for connecting a cable to connect the decryption-enabling device to the hardware interface connection of the computer device.

17. The decryption-enabling device of claim 15, further arranged to store the copy of the random-access memory of the computer device in the memory of the decryption-enabling device.

18. The decryption-enabling device of claim 15, further comprising a card socket for receiving a memory card, and further arranged to store the copy of the random-access memory of the computer device on a memory card received by the card socket.

19. The decryption-enabling device of claim 15, further arranged to send the one or more potential decryption keys to another device for decryption of the disk image.

20. The decryption-enabling device of claim 15, further arranged to create using the processor a copy of the disk image by copying it from a disk of the computer device, for decryption using at least one of the one or more potential decryption keys.

21. The decryption-enabling device of claim 20, further comprising a hard disk, and further arranged to one or both of:
    store the copy of the disk image on the hard disk; and/or
    decrypt using the processor the disk image of the computer device using at least one of the one or more potential decryption keys.

* * * * *